Figure 1:
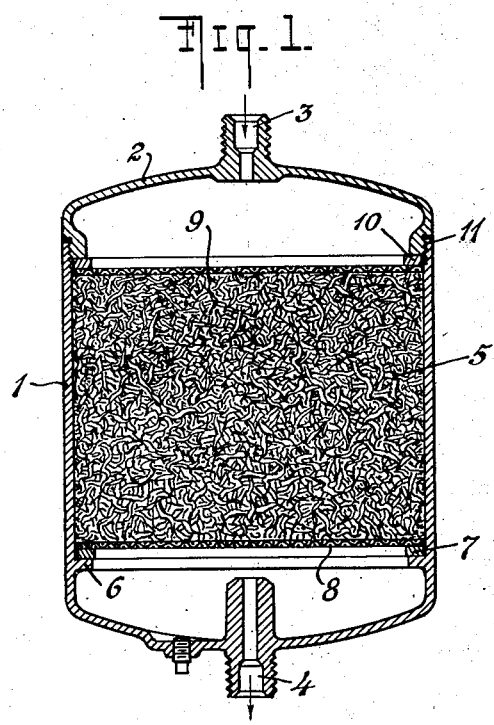

May 19, 1936. C. G. BENNETT 2,041,043

FILTER

Filed March 22, 1934

WITNESS
G. V. Rasmussen

INVENTOR
CLARENCE GRIFFITH BENNETT
BY
ATTORNEYS

Patented May 19, 1936

2,041,043

UNITED STATES PATENT OFFICE 2,041,043

FILTER

Clarence Griffith Bennett, Portland, Oreg., assignor to Paterson Parchment Paper Company, Bristol, Pa., a corporation of New Jersey Application March 22, 1934, Serial No. 716,743

5 Claims. (Cl. 210—203)

This invention relates to filters and more particularly to a filtering material that resists filtration through the body thereof and which arrests and separates by surface contact only any matter mechanically suspended in the fluid that is being filtered.

It is the general object of the invention to provide a novel filtering material composed of originally fibrous or porous material but converted by any chemical or physical means, as by parchmentization, by cellophanization (e. g. solution and subsequent precipitation) or by coating, into a more or less non-porous material which operates in such a manner that a liquid or gas to be filtered is compelled to flow between interstices or openings between adjacent pieces or layers of the material instead of through the body thereof.

Further objects of the present invention are to provide an effective substantially non-porous filtering material which will be impervious to and insoluble in the fluid to be filtered, which is non-corrodible by such fluids, and which will be relatively inexpensive to produce so that it may be replaced at a very small cost after it has been rendered unfit for further service due to being clogged by impurities collected from the fluid being filtered.

Essentially the present invention is based on the conception of a filtering element which shall consist of layers or strips of cellulosic material treated to resist filtration through the body of the material so that the fluid to be filtered will be compelled to flow through the interstices or openings between contiguous layers or strips of the cellulosic material. In carrying out the invention I preferably use ordinary Kraft or other porous fibrous type of paper in which the fibers cross each other in every direction treated for parchmentization of the fibers. The parchmentizing process, in itself well known, is one in which, in one type of such processes, paper sheets are drawn through sulphuric acid, after which the adhering acid is washed out or neutralized. The effect of this treatment is to hydrolize the fibers of the paper, the fibers being chemically changed into a horny substance (hydro-cellulose). This change results in a shrinkage of the paper and causes a natural distortion throughout the entire body of the paper so that it resembles a parchment-like material. The sheets of acid-treated, washed paper are then passed between heated rollers which press the hydrolized fibers into the body of the material, so that the parchmentized paper is made relatively non-porous and smooth. Due to above treatment the paper is rendered impervious to water, oil and other fluids and also gases. The parchmentized paper is then shredded, according to one form of my invention, and these shreds or strips are then stuffed into a container provided with an inlet and outlet for the liquids or gases to be filtered, or first compressed into suitable forms which are then inserted in the container. The bundle or mass of sheds or strips in the container are held in proper position therein by suitable means so that the fluid to be filtered is forced to pass through the bundle or mass or shreds, as will be hereinafter explained. As the strips have been treated to resist filtration through the pores of the material, the fluid that is to be filtered is compelled to travel through the interstices between adjacent shreds or layers of the paper and not through the paper itself as in the case where filter paper is used, and any matter mechanically suspended in the fluid will impinge on the walls of those paper shreds directly in the path of flow of the fluid and will be removed from the fluid. As these interstices between the shreds or strips are appreciably larger than the openings in those filtering materials which are in and of themselves porous, my filtering element is enabled to filter fluids for a considerable period without impairment of its filtering qualities and is especially desirable for the filtering of heavy viscous liquids having a low rate of flow. The interstices between the shreds or strips may be made so small in size, by compacting the shreds into a dense mass, that the most minute matter will be removed from the fluid passing therethrough. Due also to the fact that the filtering material has been rendered impervious to erosion by and insoluble in water, oil, etc., by the parchmentizing treatment, none of the material will be carried away with the filtrate as the fluid being filtered is passed through the filtering element, thus giving a clean filtrate, and the strips will not pack into a compact paste-like substance. The above qualities make my filtering material especially desirable for the filtering and cleansing of used oils, either vegetable or mineral, which are of such viscosity that they tend to mat ordinary filters in a short period, thus destroying their utility as filters.

My improved filtering material is very inexpensive to produce and its production in large quantities is entirely practicable. Also, due to the fact that certain waste products of the parchmentized vegetable paper art may be employed, the material for my filtering element may be obtained at a cost materially lower than that of most filtering materials. For example, the parchmentizing factory collects its product on large wide rolls and then trims off the ends, the trimmed roll representing the commercial product. These end trims which are of constantly varying widths, usually from one-quarter to one inch, are useless for all ordinary purposes as the paper cannot be repulped. As a result of my invention, however, these end trims which have heretofore been of no utility can be shredded or made into narrow rolls at small cost and utilized in the production of filtering elements. The inexpensiveness of producing my filtering elements renders them especially advantageous for use in internal combustion engine oil purifying systems where it is desirable to have a filtering element that is so cheap to produce that it may be replaced at a very small expense after it has been rendered unfit for further service due to impurities collected from the oil.

The invention is illustrated by way of example in the accompanying drawing which represents a vertical cross section of a container provided with my improved filtering material.

In manufacturing the vegetable parchment filter of the present invention no complications or difficulties are encountered, the regular standard procedure being followed throughout in the parchmentizing process. The parchmentized paper is then preferably shredded, the strips of which need not conform to any standard length or width. In actual practice, however, I preferably make the shreds of approximately one-eighth of an inch in width and from six to twelve inches long. The shreds or strips may be then stuffed into a container or first made into suitable forms and then inserted into the container. As shown in the drawing, the container may comprise a cup-like portion 1 having a cover 2 which is adapted to screw into the cup portion 1. The filtering material inserted in the container may be held in various positions therein by any suitable means such as screens, wires, plates, etc., so as to give the greatest efficiency to the filtering element depending upon the fluid to be filtered. In the form of structure shown, the cup-like portion 1 is provided with a circular boss 6 on the inner periphery thereof which serves as a seat for a circular ring 7 to which is attached a screen 8. When a suitable amount of filtering material has been inserted in the container, a similar screen 9 mounted on circular ring 10 which snugly fits in the container 1, is placed on top of the material. The cover 2, having a flange portion 11 which threadedly engages the inner periphery of the container 1, is then screwed in place, the lower end of the flange portion 11 bearing against the upper side of the ring 10 and compressing the rumpled shreds or webs into a compact mass. The shreds may be compacted to any desired degree, the amount of compression depending upon the fluid that is to be filtered. The fluid to be filtered is admitted into the container through an inlet 3 provided in the cover 2, percolates under the application of pressure or by gravity down through the interstices between the layers or shreds of the filtering element which removes the material mechanically suspended in the fluid, as hereinbefore described, and finally passes out through the outlet 4 provided in the bottom of the container 1 which may be suitably connected to a storage tank or in a circulation system.

The structure shown in the drawing is suitable for filtering by gravity or by forcing the fluid through under low pressure but it may be readily adapted for use where higher pressures are used by inserting a gasket between the upper edge of the cup-like portion 1 and the cover before the latter is screwed in place to prevent leakage of the fluid that is being filtered. When my filtering element is to be used in filtering oil in automobiles I prefer to place it in a container made of sheet metal having the cover crimped on or otherwise suitably attached thereto. In this case the unit is entirely discarded when the filtering element is unfit for further service. Due to the low cost of producing my filtering element, the unit can be replaced at a very small expense.

While the invention for the purposes of illustration is shown as employing parchmentized cellulosic material, other cellulosic materials formed in sheets or shreds and treated so that the material is resistant to filtration, may also be used, such as waxed paper and cellophane. These materials, while not capable of as many uses as the parchmentized material, are very effective as a filtering medium for many liquids and gases when made into a filtering element according to my invention. The invention, therefore, is directed broadly to the use of a cellulosic material treated to resist filtration through the body of the structure and arranged in such manner that the fluid to be filtered is forced to pass between narrow interstices between different strips or layers of the material.

The shredded parchment may, of course, for the purpose of convenient insertion be primarily shaped by compression into a briquette-like mass which can be inserted into or removed from the filter casing as a unit. While the masses of shredded parchment when formed under adequate pressure will sufficiently retain their shapes for ordinary purposes, the use of a suitable binder whereby to hold the shredded pieces together without interfering with the filtering qualities, is of course not excluded but is within the purview of the invention. The filtering itself may be conducted by causing the liquid to flow through the shredded parchment paper from top to bottom or from one side to the other or from the outside toward an interior take-off or vice versa, all according to the nature of the filter employed, the essential feature in each case being dependent not so much upon the particular apparatus but upon the fact that the fluid in passing through the apparatus is retarded in myriads of minute channels constantly changing in direction and consequently forcing suspended foreign material to find lodgment against side walls of the passages, the fluid being prevented from passing through the filtering material itself but compelled to find its way along side walls of such material.

I claim:

1. A filter body adapted for use in a container having an inlet for a fluid to be filtered and an outlet for the filtered fluid, said body being composed of webs of cellulosic material treated to render the surfaces thereof impermeable to the fluid to be filtered, the side surfaces being unattached to each other and being relatively non-fibrous and said webs being so compacted and arranged as to sub-divide the space occupied by the filter body into a plurality of interstices formed between closely adjacent surfaces of the cellulosic webs.

2. A filter body adapted for use in a container having an inlet for a fluid to be filtered and an outlet for the filtered fluid, said body being composed of webs of cellulosic material treated to render the surfaces thereof impermeable to the fluid to be filtered and insoluble in such fluid, the side surfaces being unattached to each other and being relatively non-fibrous and said webs being so rumpled together into a compact mass as to sub-divide the space occupied by the filter body into a plurality of minute channels formed between closely adjacent surfaces of the cellulosic webs and having constantly changing directions whereby fluid forced through the filter body is compelled to travel sinuously through restricted passages, thereby causing the suspended matter carried by the fluid to find lodgment against the rumpled side surfaces of the webs.

3. A filter body such as described in claim 1 in which the cellulosic material is constituted of vegetable parchment.

4. A filter body such as described in claim 1 in which the cellulosic material is constituted of a plurality of shreds of cellulosic webs.

5. A filter comprising a container having an inlet and an outlet, a filtering element composed of a plurality of webs of cellulosic material treated to render such material impervious to and insoluble in the fluid to be filtered, said webs being rumpled together in a compact mass in such a manner that a large number of minute channels having constantly changing directions are formed between closely adjacent side surfaces thereof whereby the fluid being filtered is compelled to flow along the rumpled side surfaces of said webs while the suspended matter in the fluid is forced to find lodgment against such side surfaces and means to hold the filtering element in position in the container.

CLARENCE GRIFFITH BENNETT.